US011687615B2

(12) United States Patent
Zhang

(10) Patent No.: US 11,687,615 B2
(45) Date of Patent: Jun. 27, 2023

(54) TILING ALGORITHM FOR A MATRIX MATH INSTRUCTION SET

(71) Applicant: Advanced Micro Devices, Inc., Santa Clara, CA (US)

(72) Inventor: Hua Zhang, Shanghai (CN)

( * ) Notice: Subject to any disclaimer, the term of this patent is extended or adjusted under 35 U.S.C. 154(b) by 0 days.

(21) Appl. No.: 16/232,768

(22) Filed: Dec. 26, 2018

(65) Prior Publication Data

US 2020/0201931 A1  Jun. 25, 2020

(30) Foreign Application Priority Data

Dec. 19, 2018 (CN) .......................... 201811566422.X

(51) Int. Cl.
*G06F 17/16* (2006.01)
*G06N 20/00* (2019.01)

(52) U.S. Cl.
CPC ............. *G06F 17/16* (2013.01); *G06N 20/00* (2019.01)

(58) Field of Classification Search
CPC ...... G06F 17/16; G06F 9/3885; G06F 9/3887; G06F 9/3824; G06F 15/80; G06F 15/8007; G06F 15/8092; G06F 9/30032; G06F 15/8069; G06N 20/00
USPC ....................................................... 345/644
See application file for complete search history.

(56) References Cited

U.S. PATENT DOCUMENTS

| 5,657,420 A | 8/1997 | Jacobs et al. |
| 6,067,287 A | 5/2000 | Chung-Ju et al. |
| 7,873,812 B1 * | 1/2011 | Mimar ...................... G06T 1/20 712/22 |
| 8,131,660 B2 | 3/2012 | Davis et al. |

(Continued)

FOREIGN PATENT DOCUMENTS

| EP | 3098762 A1 | 11/2016 |
| KR | 20180133726 A | 12/2018 |

(Continued)

OTHER PUBLICATIONS

AMD Graphics Core Next Architecture, Generation 3 (2016). Retrieved on [May 14, 2020]. Retrieved from the Internet developer. amd.com/wordpress/media/2013/12/AMD_GCN3_Instruction_Set_Architecture_rev1.1.pdf (Year: 2016).*

(Continued)

*Primary Examiner* — Emily E Larocque
*Assistant Examiner* — Carlo Waje
(74) *Attorney, Agent, or Firm* — Kowert Hood Munyon Rankin and Goetzel PC; Rory D. Rankin

(57) ABSTRACT

Systems, apparatuses, and methods for implementing a tiling algorithm for a matrix math instruction set are disclosed. A system includes at least a memory, a cache, a processor, and a plurality of compute units. The memory stores a plurality of matrix elements in a linear format, and the processor converts the plurality of matrix elements from the linear format to a tiling format. Each compute unit retrieves a plurality of matrix elements from the memory into the cache. Each compute unit includes a matrix operations unit which (Continued)

loads the plurality of matrix elements of corresponding tile(s) from the cache and performs a matrix operation on the plurality of matrix elements to generate a result in the tiling format. The system generates a classification of a first dataset based on results of the matrix operations.

19 Claims, 17 Drawing Sheets

(56) References Cited

U.S. PATENT DOCUMENTS

| | | | | |
|---|---|---|---|---|
| 8,316,072 | B2* | 11/2012 | Gustavson | G06F 17/16 708/520 |
| 8,369,595 | B1 | 2/2013 | Derakhshani et al. | |
| 9,319,137 | B2 | 4/2016 | Zhuge et al. | |
| 10,078,794 | B2 | 9/2018 | Pierce et al. | |
| 10,719,323 | B2* | 7/2020 | Baum | G06F 9/3802 |
| 10,747,844 | B2* | 8/2020 | Bannon | G06F 12/0875 |
| 10,762,392 | B2* | 9/2020 | Zhang | G06N 3/063 |
| 10,877,756 | B2* | 12/2020 | Valentine | G06F 9/30112 |
| 2002/0198911 | A1 | 12/2002 | Blomgren et al. | |
| 2005/0071409 | A1* | 3/2005 | Gustavson | G06F 12/0875 708/514 |
| 2008/0140994 | A1* | 6/2008 | Khailany | G06F 9/30032 712/225 |
| 2010/0241824 | A1* | 9/2010 | Carlson | G06F 9/3887 712/22 |
| 2011/0055517 | A1* | 3/2011 | Eichenberger | G06F 9/3001 712/7 |
| 2014/0201450 | A1* | 7/2014 | Haugen | G06F 9/30036 711/125 |
| 2015/0178246 | A1 | 6/2015 | Herrero Abellanas et al. | |
| 2015/0358755 | A1 | 12/2015 | Luo et al. | |
| 2016/0062294 | A1 | 3/2016 | Murashima | |
| 2016/0179434 | A1 | 6/2016 | Herrero Abellanas et al. | |
| 2017/0316312 | A1 | 11/2017 | Goyal et al. | |
| 2018/0032859 | A1 | 2/2018 | Park et al. | |
| 2018/0189641 | A1 | 7/2018 | Boesch et al. | |
| 2018/0218303 | A1 | 8/2018 | Cole et al. | |
| 2018/0321938 | A1 | 11/2018 | Boswell et al. | |
| 2019/0028752 | A1 | 1/2019 | Zhang et al. | |
| 2019/0235866 | A1* | 8/2019 | Das Sarma | G06F 17/16 |
| 2019/0325305 | A1 | 10/2019 | Zhang et al. | |
| 2020/0134432 | A1 | 4/2020 | Lagudu et al. | |
| 2020/0184002 | A1* | 6/2020 | Sakharshete | G06F 17/16 |
| 2020/0233665 | A1* | 7/2020 | Valentine | G06F 9/30043 |
| 2020/0302285 | A1 | 9/2020 | Wang et al. | |

FOREIGN PATENT DOCUMENTS

| | | |
|---|---|---|
| WO | WO2013039606 A1 | 3/2013 |
| WO | 2017003887 A1 | 1/2017 |
| WO | WO2018151803 A1 | 8/2018 |
| WO | 2018213636 A1 | 11/2018 |

OTHER PUBLICATIONS

Guo et al., "A Survey of FPGA-Based Neural Network Inference Accelerator" on ACM Trans. Reconfig. Technol. Syst. 9, 4, Article 11 (Dec. 2017). Retrieved on [May 18, 2020]. Retrieved from the Internet arxiv.org/pdf/1712.08934.pdf (Year: 2017).*

Warden P. on "Why GEMM is at the heart of deep learning", Retrieved on [May 18, 2020]. Retrieved from the Internet petewarden.com/2015/04/20/why-gemm-is-at-the-heart-of-deep-learning/ (Year: 2015).*

Nurvitadhi et al. on "Can FPGAs Beat GPUs in Accelerating Next-Generation Deep Neural Networks", FPGA '17: Proceedings of the 2017 ACM/SIGDA International Symposium on Field-Programmable Gate Arrays, Feb. 2017, pp. 5-14, Retrieved on [May 19, 2020] doi.org/10.1145/3020078.3021740 (Year: 2017).*

Non-Final Office Action in U.S. Appl. No. 15/657,613, dated Oct. 5, 2018, 12 pages.

Final Office Action in U.S. Appl. No. 15/657,613, dated Mar. 8, 2019, 10 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation Test in Europe, Mar. 14, 2016, pp. 1393-1398.

Notice of Allowance in U.S. Appl. No. 16/234,956, dated May 5, 2020, 10 pages.

International Search Report and Written Opinion in International Application No. PCT/US2019/067050, dated Apr. 9, 2020, 14 pages.

Park et al., "Tiling, block data layout, and memory hierarchy performance", IEEE Transactions on Parallel and Distributed Systems, vol. 14, No. 7, Jul. 2003, pp. 640-654.

Non-Final Office Action in Japanese Patent Application No. 2021-531339, dated Jul. 26, 2022, 18 pages.

Office Action in Korean Patent Application No. 10-2021-7016767, dated Dec. 5, 2022, 13 pages.

* cited by examiner

| 32x32 Block 0 | 32x32 Block 4 | 32x32 Block 8 | 32x32 Block 12 |
|---|---|---|---|
| 32x32 Block 1 | 32x32 Block 5 | 32x32 Block 9 | 32x32 Block 13 |
| 32x32 Block 2 | 32x32 Block 6 | 32x32 Block 10 | 32x32 Block 14 |
| 32x32 Block 3 | 32x32 Block 7 | 32x32 Block 11 | 32x32 Block 15 |

| 128x128 Block 0 | 128x128 Block 1 | ⋮ | 128x128 Block 7 |
| --- | --- | --- | --- |
| 128x128 Block 8 | 128x128 Block 9 | ⋮ | 128x128 Block 15 |
| ⋮ | ⋮ | ⋮ | ⋮ |
| 128x128 Block 56 | 128x128 Block 57 | ⋮ | 128x128 Block 63 |

FIG. 9

|  |  |  |  |  |  |  |  |  |  |  |  |  |
|---|---|---|---|---|---|---|---|---|---|---|---|---|
| 0 | 2 | 4 | 6 | 8 | 10 | 12 | 14 | 16 | 18 | 20 | 22 | 24 |
| 1 | 3 | 5 | 7 | 9 | 11 | 13 | 15 | 17 | 19 | 21 | 23 | 25 |
| 64 | 66 | 68 | 70 | 72 | 74 | 76 | 78 | 80 | 82 | 84 | 86 | 88 |
| 65 | 67 | 69 | 71 | 73 | 75 | 77 | 79 | 81 | 83 | 85 | 87 | 89 |

| 32x32 Block 0 | 32x32 Block 1 | 32x32 Block 2 | 32x32 Block 3 |
|---|---|---|---|
| 32x32 Block 4 | 32x32 Block 5 | 32x32 Block 6 | 32x32 Block 7 |
| 32x32 Block 8 | 32x32 Block 9 | 32x32 Block 10 | 32x32 Block 11 |
| 32x32 Block 12 | 32x32 Block 13 | 32x32 Block 14 | 32x32 Block 15 |

FIG. 12

| 128x128 Block 0 | 128x128 Block 1 | ⋮ | 128x128 Block 7 |
|---|---|---|---|
| 128x128 Block 8 | 128x128 Block 9 | ⋮ | 128x128 Block 15 |
| ⋮ | ⋮ | ⋮ | ⋮ |
| 128x128 Block 56 | 128x128 Block 57 | ⋮ | 128x128 Block 63 |

| 0 | 4 | 8 | 12 | 16 | 20 | 24 | 28 | 32 | 36 | 40 | 44 | 48 | ... | 60 |
| 1 | 5 | 9 | 13 | 17 | 21 | 25 | 29 | 33 | 37 | 41 | 45 | 49 | ... | 61 |
| 2 | 6 | 10 | 14 | 18 | 22 | 26 | 30 | 34 | 38 | 42 | 46 | 50 | ... | 62 |
| 3 | 7 | 11 | 15 | 19 | 23 | 27 | 31 | 35 | 39 | 43 | 47 | 51 | ... | 63 |

```
unsigned int Mdim=1024;
unsigned int Ndim=1024;
unsigned int Kdim=1024;
unsigned int TileA_x = 2;
unsigned int TileA_y = 32;
unsigned int TileA2d_x = 128;
unsigned int TileA2d_y = 128;
unsigned int TileB_x = 32;
unsigned int TileB_y = 2;
unsigned int TileB2d_x = 128;
unsigned int TileB2d_y = 128;
unsigned int TileC_x = 32;
unsigned int TileC_y = 4;
unsigned int TileC2d_x = 128;
unsigned int TileC2d_y = 128;

for (int iii = 0; iii < Mdim; iii = iii + TileA_y)
{
   for (int jjj = 0; jjj < Kdim; jjj = jjj + TileA_y)
   {
     int blk_2d_x = jjj / TileA2d_x;
     int blk_2d_y = iii / TileA2d_y;
     int blk_inn_x = (jjj - blk_2d_x * TileA2d_x) / TileA_y;
     int blk_inn_y = (iii - blk_2d_y * TileA2d_y) / TileA_y;
     int blk_offset = (blk_2d_x * (Mdim / TileA2d_y) + blk_2d_y)
                  * (TileA2d_x * TileA2d_y)
                  + (blk_inn_x * (TileA2d_y / TileA_y) + blk_inn_y)*
                  (TileA_y * TileA_y);
     for (int m = 0; m < TileA_y; m++)
     {
        for (int n = 0; n < TileA_y; n++)
   A_package_outbuffer[blk_offset + (m + (n/TileA_x)*TileA_y)* TileA_x + (n%TileA_x)] =
         A_outbuffer[(iii + m) * Kdim + jjj + n];
     }
   }
}
```

```
for (int iii = 0; iii < Kdim; iii = iii + TileB_x)
{
   for (int jjj = 0; jjj < Ndim; jjj = jjj + TileB_x)
   {
      int blk_2d_x = jjj / TileB2d_x;
      int blk_2d_y = iii / TileB2d_y;
      int blk_inn_x = (jjj - blk_2d_x * TileB2d_x) / TileB_x;
      int blk_inn_y = (iii - blk_2d_y * TileB2d_y) / TileB_x; //TileB_y int blk_offset = (blk_2d_y * (Ndim / TileB2d_x) + blk_2d_x)
                   * (TileB2d_x * TileB2d_y)
                      + (blk_inn_y * (TileB2d_x / TileB_x) + blk_inn_x) *
                   (TileB_x * TileB_x);

for (int n = 0; n < TileB_x; n++)
      {
         for (int m = 0; m < TileB_x; m++)
B_package_outbuffer[blk_offset + (n + (m/TileB_y)*TileB_x) * TileB_y + (m%TileB_y)] =
            B_outbuffer[(iii + m) * Ndim + jjj + n];
      }
   }
}
```

*FIG. 16*

TILING ALGORITHM FOR A MATRIX MATH INSTRUCTION SET

PRIORITY INFORMATION

This application claims benefit of priority to Chinese Application No. 201811566422.X, entitled "Tiling Algorithm For A Matrix Math Instruction Set", filed Dec. 19, 2018, the entirety of which is incorporated herein by reference in its entirety.

BACKGROUND

Description of the Related Art

Performing matrix operations in parallel processing units involves loading large amounts of data from memory which results in high memory bandwidth utilization. Loading matrix elements typically requires calculating offsets for stepping through the matrix data elements stored in memory in a linear format. However, this requires a complicated formula for each load instruction to calculate the offset used to move through the elements of the matrix in the correct order to perform the matrix operation. As used herein, the term "linear format" is defined as a format where consecutive matrix elements are stored in a sequential fashion in adjacent memory locations until the end of a physical row or column of memory is reached. Examples of linear formats for storing matrix elements include row-major order and column-major order. In a row-major order, consecutive elements of a matrix row reside next to each other in memory. In a column-major order, consecutive elements of a matrix column reside next to each other in memory. Processing matrix elements in a linear format results in an inefficient usage of memory bandwidth and matrix operation units.

BRIEF DESCRIPTION OF THE DRAWINGS

The advantages of the methods and mechanisms described herein may be better understood by referring to the following description in conjunction with the accompanying drawings, in which:

FIG. 5 is a diagram of one implementation of a data layout for a source B matrix being operated on by a SIMD unit.

FIG. 6 is a diagram of one implementation of a tiling layout for a tiling block.

FIG. 8 is a diagram of one implementation of the format of a 128×128 block within a source A matrix.

FIG. 9 is a diagram of one implementation of the format of an image constructed of 128×128 blocks.

FIG. 10 is a diagram of one implementation of a source B matrix.

FIG. 12 is a diagram of one implementation of the format of a 128×128 block within a source B matrix.

FIG. 13 is a diagram of one implementation of the format of an image constructed of 128×128 blocks.

FIG. 14 is a diagram of one implementation of a result C matrix.

FIG. 15 illustrates an example of pseudocode for converting a source A matrix from linear format to tiling format in accordance with one implementation.

FIG. 16 illustrates an example of pseudocode for converting a source B matrix from linear format to tiling format in accordance with one implementation.

DETAILED DESCRIPTION OF IMPLEMENTATIONS

Figure 1:
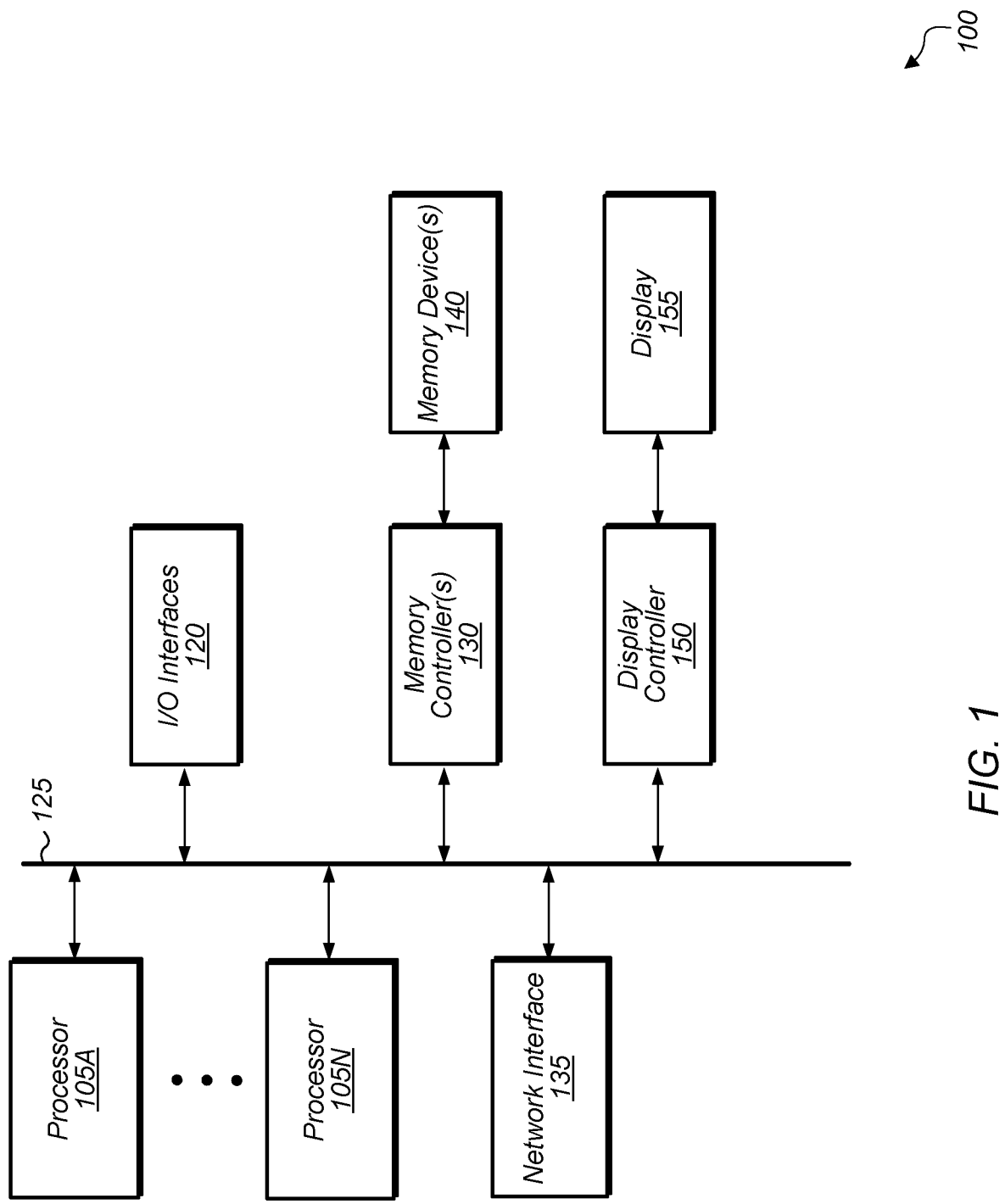
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for converting matrix data from a linear format to a tiling format for performing matrix operations are disclosed herein. A system includes at least a memory, a cache, a processor, and a plurality of compute units. The memory stores a plurality of matrix elements in a linear format, and the processor converts the plurality of matrix elements from the linear format to a tiling format. In one implementation, the term "tile format" or "tiling format" is defined as a format for storing matrix elements in memory locations such that matrix elements for performing a given matrix operation are stored in adjacent memory locations. In one implementation, the given matrix operation is a matrix multiplication operation. In another implementation, the term "tiling format" is defined as a format where matrix elements that constitute a column of a tile are stored in adjacent memory locations. The term "tile" is defined as an N×M block of elements, where N and M are positive integers, and where at least one of N or M is greater than one. A "tile" can also be referred to herein as a "block". In one implementation, the number "M" of columns of a tile of a first source matrix is equal to a number of lanes of a matrix operations unit. In one implementation, for a matrix multiplication operation, a first source matrix is partitioned into tiles of N×M elements, while a second source matrix is partitioned into tiles of M×N elements.

The tiling format results in the matrix data being ordered with a specific layout which allows data to be loaded successively without performing an offset calculation. Each compute unit retrieves a row and/or column of matrix elements of one or more tiles from the memory into the cache. Each compute unit includes a matrix operations unit which retrieves the plurality of matrix elements of the corresponding tile(s) from the cache and performs a matrix operation on the plurality of matrix elements to generate a result in the tiling format. In one implementation, the system performs a plurality of matrix operations on the plurality of compute units as part of a machine learning engine to generate a classification of a first dataset. For example, in one implementation, the system performs the plurality of matrix operations while implementing a neural network to classify an image into one or more categories. The neural network can be a convolutional neural network, recurrent neural network, or other type. Various tasks such as handwritten digit classification and face detection can be performed by the neural network. Additionally, neural networks can perform other, more challenging, visual classification tasks. Other applications for neural networks include speech recognition, language modeling, sentiment analysis, text prediction, and others. In other implementations, the system performs a plurality of matrix operations on the plurality of compute units as part of other types of software applications.

In various implementations, the cache has P channels, where P is a positive integer greater than one. In one implementation, P is equal to 32. In other implementations, P is equal to other numbers. Requests are mapped to different channels of the cache based on a portion of the physical address bits. For example, in one implementation, each channel is mapped with bits 12-8 of the physical address. In other implementations, the channel mapping is based on other bits of the physical address. In one implementation, storing the matrix elements in the tiling format increases the cache hit efficiency. In a typical application, each compute unit processes different matrix tiles but the tiles may map to the same cache channel. This can impact the cache efficiency because different compute units will end up requesting data via the same cache channel. Accordingly, the compute units will be waiting for the data to be returned from the cache, and the cache will be processing the requests one by one in the same channel. However, when the matrix elements are stored in the tiling format, different compute units are mapped to different channels. When the compute units are executing the same kernel in parallel, the requests are sent to the cache on different channels, which helps to increase the cache access efficiency.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
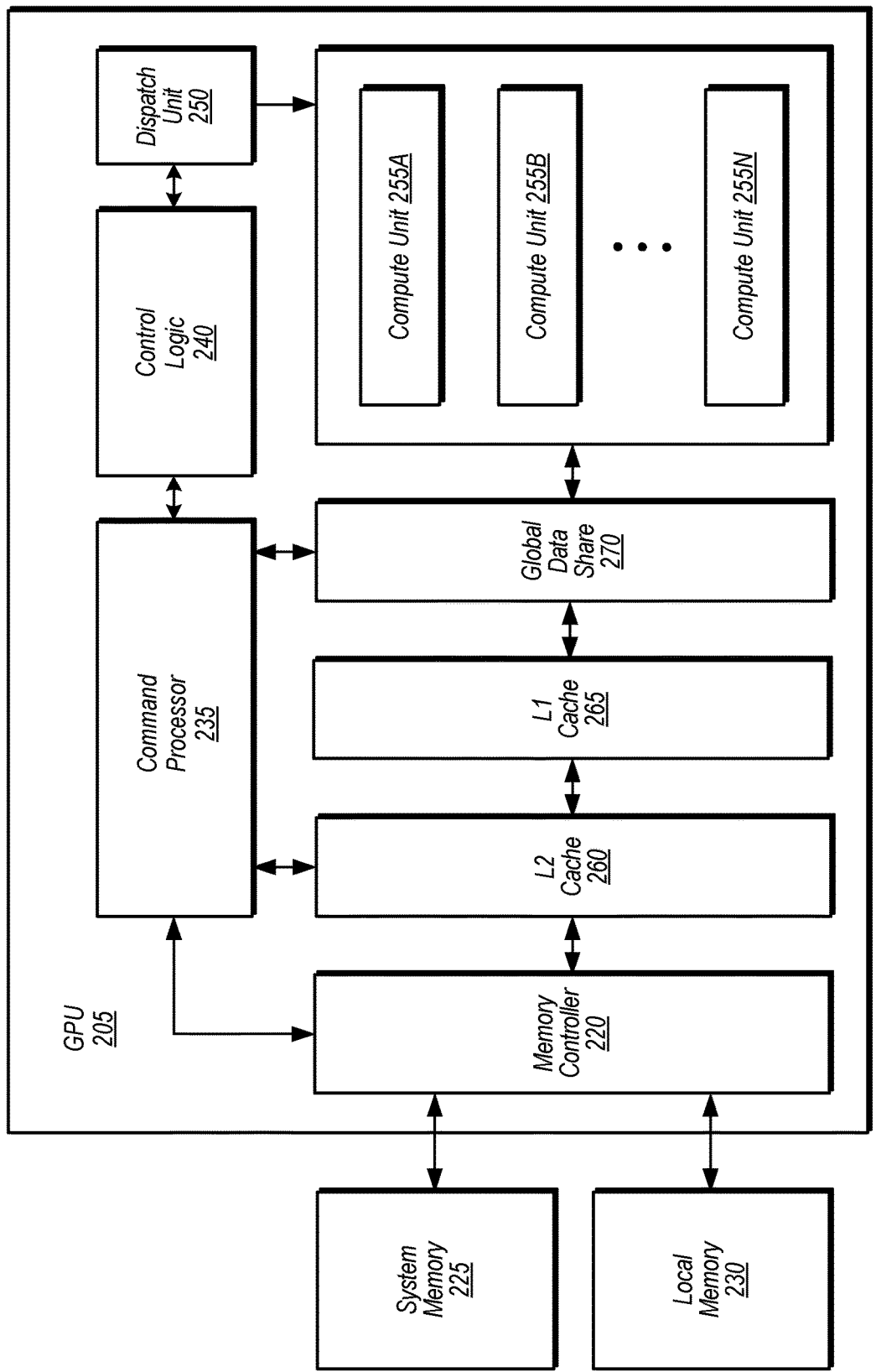
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. In one implementation, each compute unit 255A-N includes a matrix operations unit. For example, the matrix operations unit performs matrix multiplication operations. Additionally, in various implementations, the matrix operations unit performs other types of matrix operations. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, matrix data is stored in a linear format in system memory 225 and/or local memory 230. Prior to loading the matrix data into L2 cache 260, the matrix data is converted from the linear format to a tiling format. In one implementation, the term "tiling format" is defined as storing matrix elements together into units of tiles, with each tile storing an N×M block of matrix elements, where N and M are positive integers. The "tiling format" results in consecutive tiles being stored in a sequential fashion in memory.

In one implementation, command processor 235 converts the matrix data from the linear format to the tiling format. In another implementation, a host processor (e.g., processor 105A of FIG. 1) converts the matrix data from the linear format to the tiling format. Then, during execution of wavefronts on compute units 255A-N, the matrix data is loaded from L2 cache 260 in an efficient manner due to the matrix data being stored in the tiling format. In one implementation, when the matrix elements are stored in the tiling format, the matrix data elements are read on multiple channels from L2 cache 260 into compute units 255A-N in parallel. This is a more efficient approach than having the matrix data elements stored in linear format, which would result in matrix data elements being read on a single channel from L2 cache 260 in serial fashion.

Figure 3:
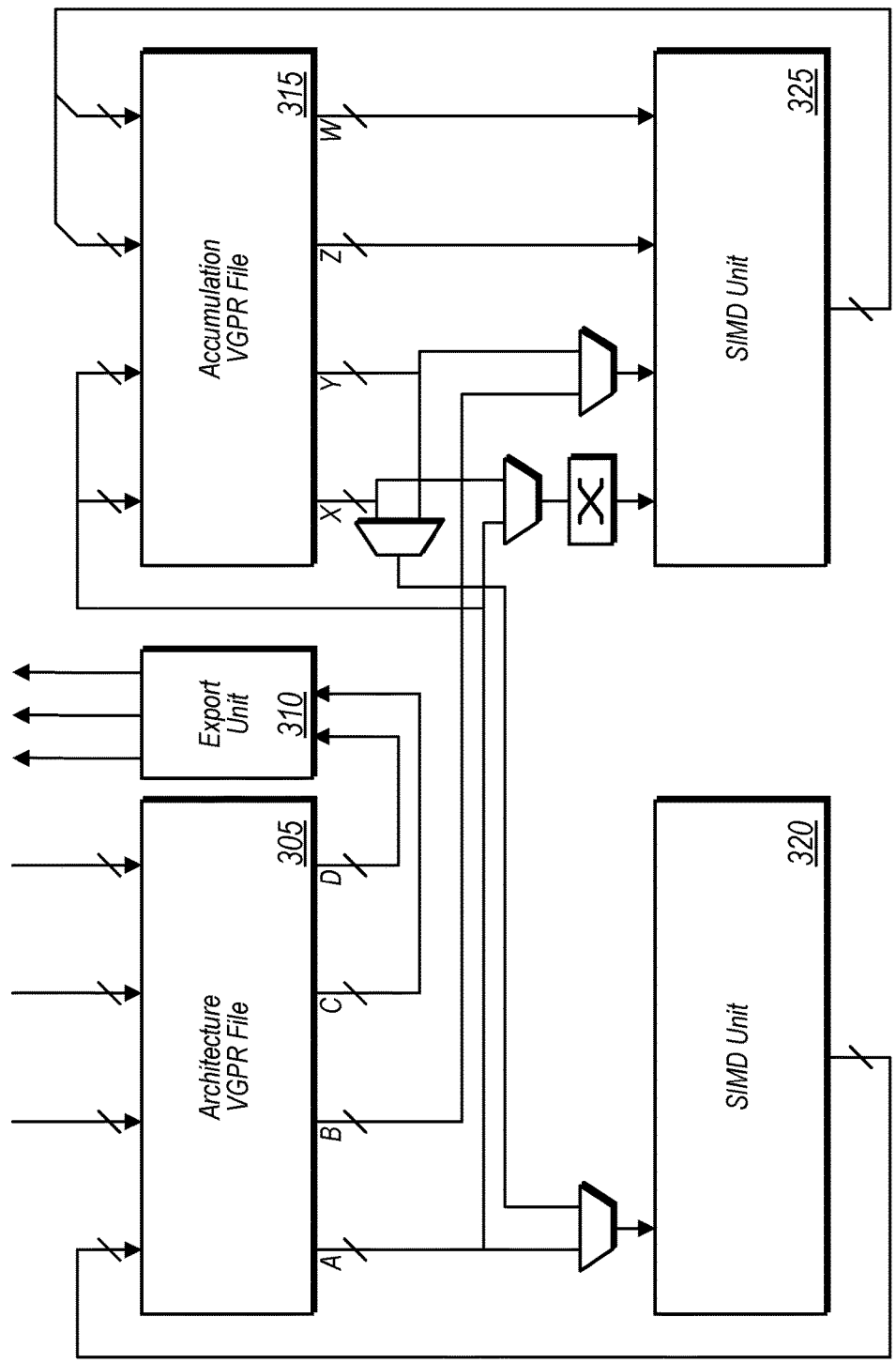
FIG. 3 is a block diagram of one implementation of a matrix operations unit.

Referring now to FIG. 3, a block diagram of one implementation of a matrix operations unit 300 is shown. In one implementation, each compute unit 255A-N includes the circuitry of matrix operations unit 300. In one implementation, matrix operations unit 300 includes at least architecture vector general purpose register (VGPR) file 305, export unit 310, accumulation VGPR file 315, single instruction, multiple data (SIMD) unit 320, and SIMD unit 325. It should be understood that matrix operations unit 300 includes any number of other components which are not shown to avoid obscuring the figure. Additionally, in other implementations, matrix operations unit 300 is organized in other suitable manners.

In one implementation, SIMD unit 320 is a floating point unit for performing various floating point operations and SIMD unit 325 is a matrix unit for performing various matrix operations (e.g., dot product operations, matrix multiplication operations). In one implementation, each separate input shown connected to architecture VGPR file 305 and accumulation VGPR file 315 has 16 lanes of 32 bits each. In other implementations, the inputs have other numbers of lanes of other bit-widths. In one implementation, SIMD unit 325 operates on input matrix elements more efficiently when the matrix elements are stored in a tiling format. Accordingly, in this implementation, the matrix elements are converted from a linear format to the tiling format prior to being read into architecture VGPR file 305 and/or accumulation VGPR file 315. This enables the operations to be performed by SIMD unit 325 in a more efficient manner.

Figure 4:
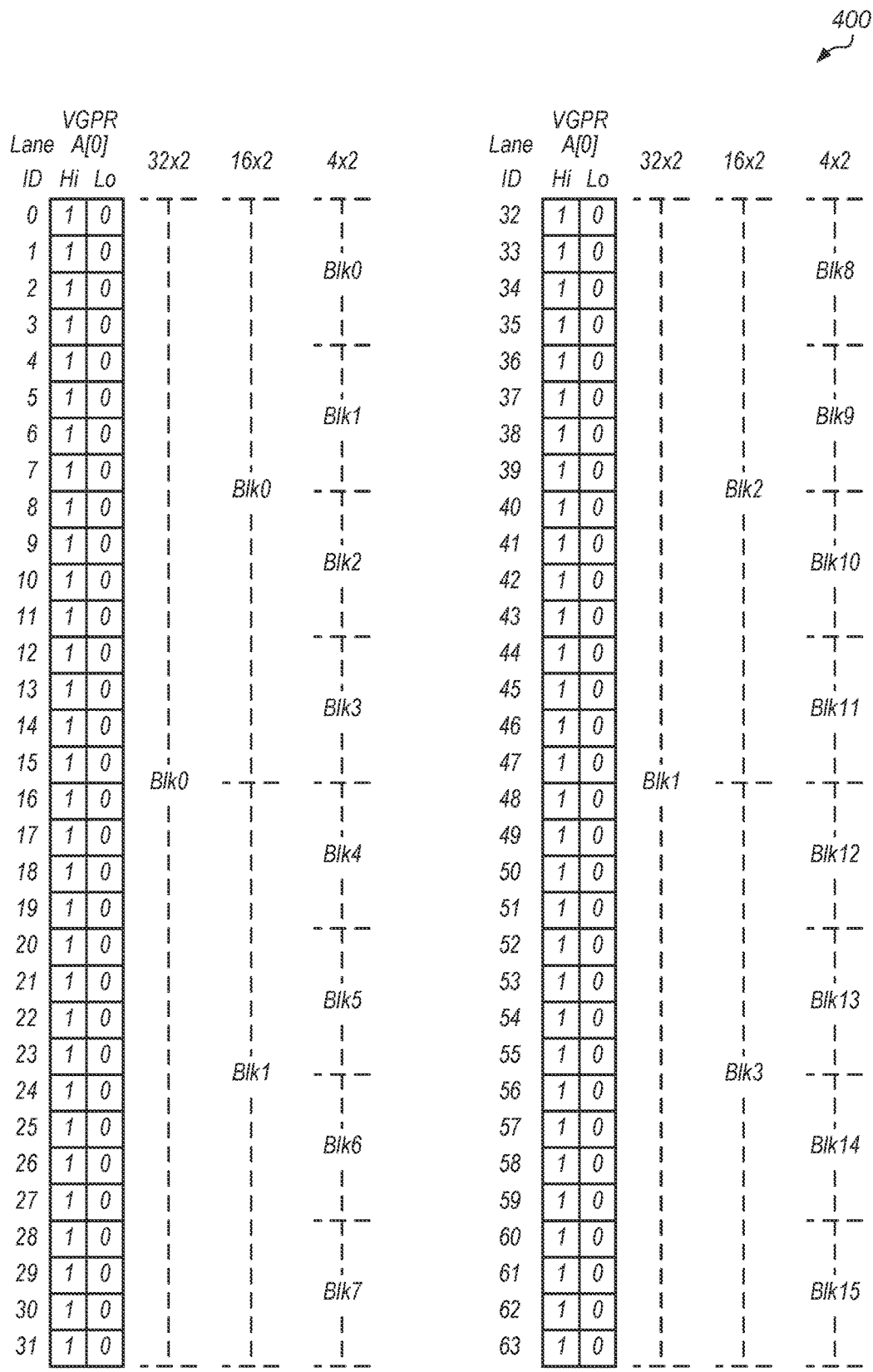
FIG. 4 is a diagram of one implementation of a data layout for a source A matrix being operated on by a SIMD unit.

Turning now to FIG. 4, a diagram of one implementation of the data layout 400 of a source A matrix being operated on by a SIMD unit is shown. In one implementation, SIMD unit 325 (of FIG. 3) is organized according to the data layout 400 illustrated in FIG. 4 for reading in a source A matrix to perform a matrix multiplication operation of a source A matrix multiplied by a source B matrix. For example, in this implementation, there are 64 threads in data layout 400 per SIMD unit. In other implementations, the SIMD unit includes other numbers (e.g., 32, 128) of threads in the data layout. Each thread of data layout 400 corresponds to a lane of the SIMD unit.

Depending on the size of a block being processed, different numbers of blocks can be mapped according to data layout 400. For example, if each block is of size 32×2, then two blocks (Blk0 and Blk1) are mapped from the VGPR file to the SIMD unit. If each block is of size 16×2, then four blocks (Blk0, Blk1, Blk2, and Blk3) are mapped from the VGPR file to the SIMD unit. If each block is of size 4×2, then sixteen blocks (Blk0, Blk1, Blk2, Blk3, Blk4, Blk5, Blk6, Blk7, Blk8, Blk9, Blk10, Blk11, Blk12, Blk13, Blk14, and Blk15) are mapped from the VGPR file to the SIMD unit.

Figure 5:
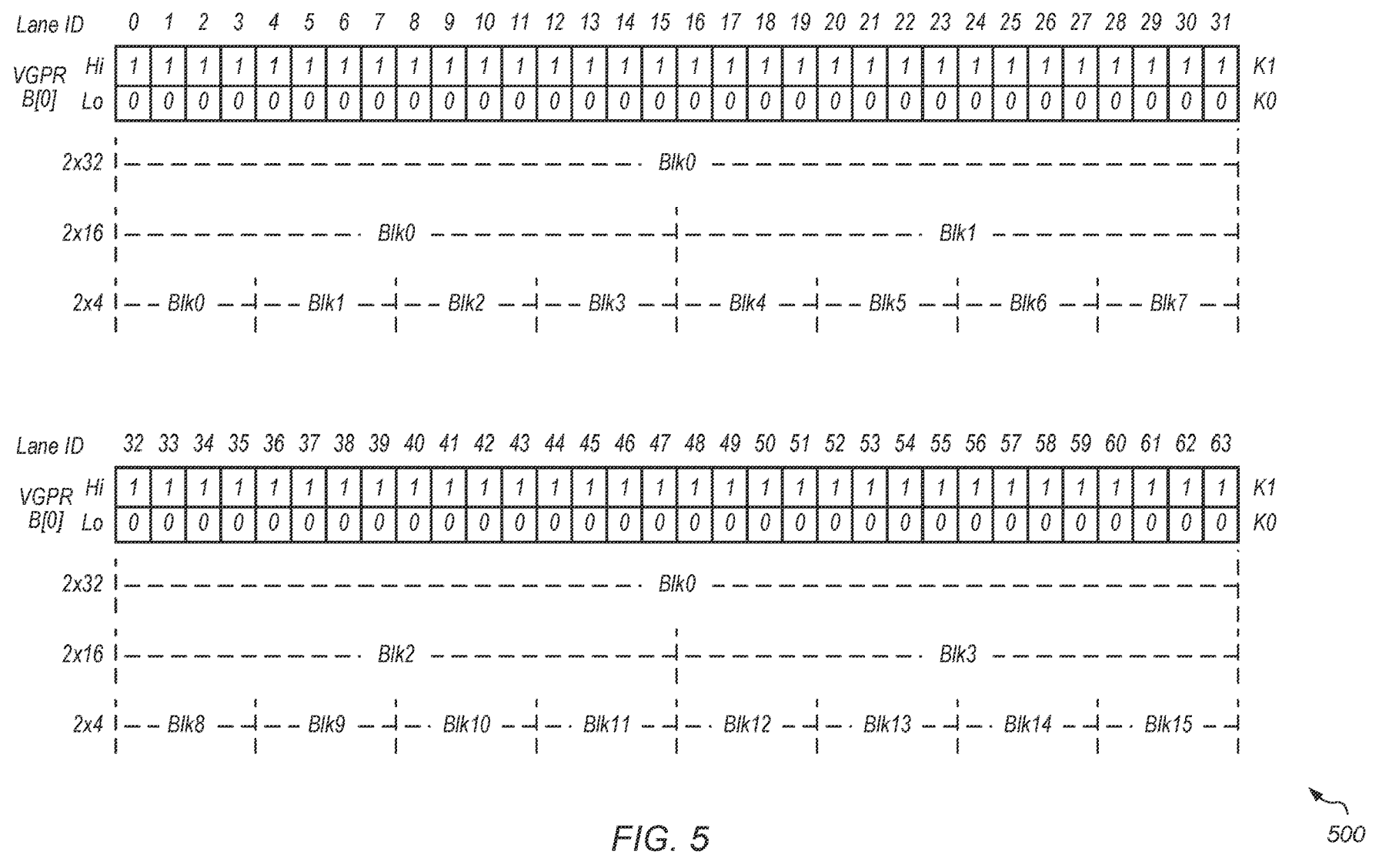

Referring now to FIG. 5, a diagram of one implementation of a data layout 500 for a source B matrix for a SIMD unit is shown. In one implementation, the connections between a VGPR file and a SIMD unit (e.g., SIMD unit 325 (of FIG. 3)) are organized according to the data layout 500. For example, in one implementation, data layout 500 defines the connections for loading a source B matrix so as to perform a matrix multiplication operation between a source A matrix and a source B matrix. In one implementation, data layout 500 is organized for 64 threads. In other implementations, data layout 500 includes other numbers of threads. Each thread of data layout 500 corresponds to a lane of the SIMD unit. Depending on the size (e.g., 2×32, 2×16, 2×4) of a block being processed, different numbers (e.g., 2, 4, 16) of blocks can be mapped according to data layout 500.

Figure 6:
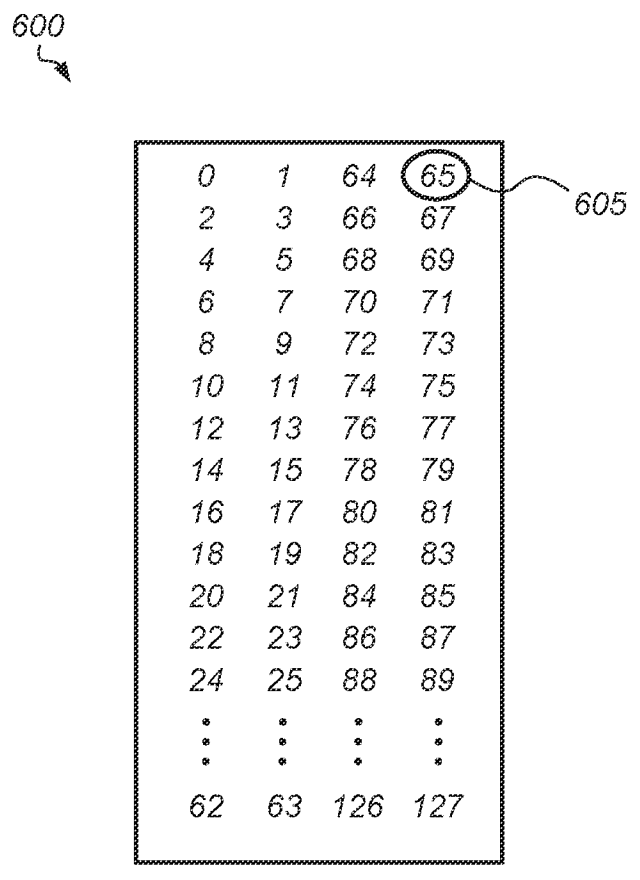

Turning now to FIG. 6, a diagram of one implementation of a tiling layout for a block 600 of a source A matrix is shown. In one implementation, a matrix is partitioned into multiple blocks, with each block organized according to block 600. The organization of elements in block 600 illustrates the mapping relationship between the linear data and the tiling data. For example, the matrix element 65 is indicated by circle 605. The original position of this element is (x=3, y=0). Accordingly, the position is (y*stride+x) =0*4+3=3 in the linear format and position 65 in the tiling format. In one implementation, the basic tiling block is 32×4 for the source A matrix and 4×32 for the source B matrix to implement a matrix multiplication operation. In other implementations, the basic tiling block for a matrix operation can be other sizes. In one implementation, for the next level in the matrix hierarchy, 8 basic blocks of size 32×4 are combined into a 32×32 middle block. Additionally, moving up the matrix hierarchy, 16 middle blocks are combined into a 128×128 large block. It is assumed for the purposes of the remaining discussion that the matrix size being processed is aligned with the 128×128 large block. However, it should be understood that in other implementations, the matrix size can be aligned with other sizes of blocks.

Figure 7:
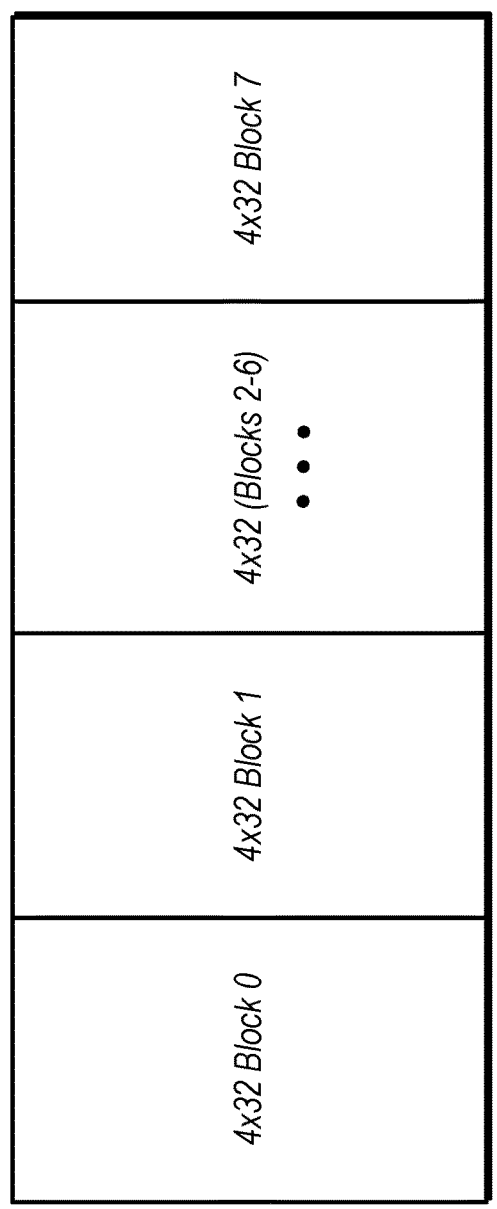
FIG. 7 is a diagram of one implementation of the format of a 32×32 block within a source A matrix.

Referring now to FIG. 7, a diagram of one implementation of a 32×32 block 700 within a source A matrix is shown. Each 4×32 block is arranged from block 0 to block 7 from left to right as shown to form a 32×32 block 700. In other implementations, other sizes of blocks can be combined together to form a block higher up in the matrix block hierarchy.

Turning now to FIG. 8, a diagram of one implementation of a 128×128 block 800 within a source A matrix is shown. The first column of 128×128 block 800 is constructed from 32×32 blocks 0-3 as shown in block 800. The second column of 128×128 block 800 is constructed from 32×32 blocks 4-7, the third column of 128×128 block 800 is constructed from 32×32 blocks 8-11, and the fourth column (i.e., the rightmost column) of 128×128 block 800 is constructed from 32×32 blocks 12-15. In one implementation, each 32×32 block is constructed according to block 700 (of FIG. 7).

Referring now to FIG. 9, a diagram of one implementation of an image 900 constructed of 128×128 blocks is shown. It should be understood that in other implementations, an image can be constructed of other sizes of blocks which can be organized in other suitable manners. For example, in other implementations, an image can be constructed of 64×64 blocks, 256×256 blocks, or other sizes of blocks. For these implementations, the mechanisms and methods described herein for image 900 can be adapted to apply to other images made up of other sizes of blocks.

Turning now to FIG. 10, a diagram of one implementation of a tiling layout of a block 1000 of a source B matrix is shown. In one implementation, a matrix operations unit multiplies a source A matrix by a source B matrix. The organization of block 1000 of a source B matrix is one example of the organization of the elements of source B matrix block 1000 in accordance with one implementation for implementing a matrix multiplication operation.

Figure 11:
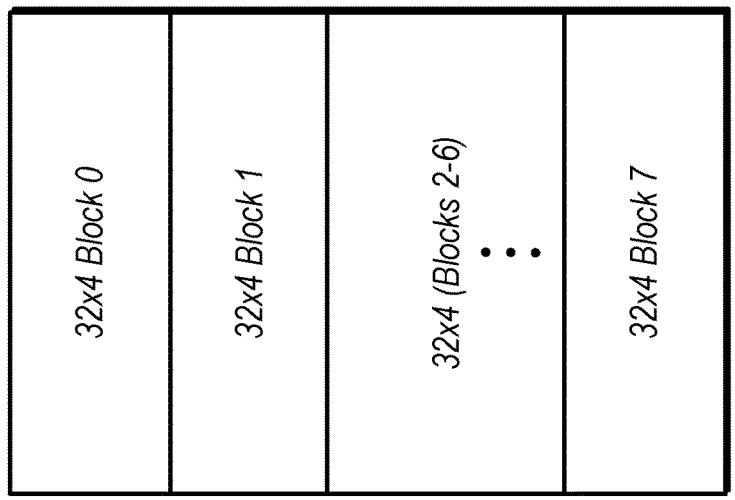
FIG. 11 is a diagram of one implementation of the format of a 32×32 block within a source B matrix.

Referring now to FIG. 11, a diagram of one implementation of a 32×32 block 1100 of a source B matrix is shown. In one implementation, 32×32 block 1100 of a source B matrix is constructed using eight different 32×4 blocks. As shown in FIG. 11, each 32×4 block is arranged from block 0 to block 7 from top to bottom as shown in block 1100. In other implementations, 32×32 block 1100 can be constructed with other numbers, sizes, and/or arrangements of smaller blocks.

Turning now to FIG. 12, a diagram of one implementation of a 128×128 block 1200 of a source B matrix is shown. The first row of 128×128 block 1200 is constructed from 32×32 blocks 0-3 moving from left to right. The second row of 128×128 block 1200 is constructed from 32×32 blocks 4-7 moving from left to right, the third row of 128×128 block 1200 is constructed from 32×32 blocks 8-11 moving from left to right, and the fourth row (i.e., the bottom row) of 128×128 block 1200 is constructed from 32×32 blocks 12-15 moving from left to right. In one implementation, each 32×32 block is constructed according to the layout of block 1100 (of FIG. 11).

Referring now to FIG. 13, a diagram of one implementation of an image 1300 constructed of 128×128 blocks is shown. The first row of image 1300 includes 128×128 blocks 0-7 moving from left to right. Similarly, the second row of image 1300 includes 128×128 blocks 8-15 moving from left to right. The other rows of image 1300 are organized in the same manner, with the bottom row including 128×128 blocks 56-63 moving from left to right. In one implementation, each 128×128 block 0-63 is constructed according to block 1200 (of FIG. 12).

Turning now to FIG. 14, a diagram of one implementation of a block 1400 of a result C matrix is shown. In one implementation, a matrix operations unit multiplies a source A matrix by a source B matrix to generate a result C matrix. The organization of the elements of block 1400 is one example of the organization of the elements of a block within a result C matrix after a matrix multiplication operation has been performed in accordance with one implementation. The first column of block 1400 includes element 0 followed by element 1, element 2, and then element 3. The second column of block 1400 includes element 4 on top of element 5 on top of element 6 on top of element 7. This pattern of element layout continues in the columns moving to the right of matrix C 1400 until the last, right-most column includes element 60, element 61, element 62, and element 63.

Referring now to FIG. 15, an example of pseudocode 1500 for converting a source A matrix from linear format to tiling format in accordance with one implementation is shown. Pseudocode 1500 includes definitions of variables with specific values that are used for one particular implementation. In other implementations, the values of these variables can vary depending on the sizes of tiles, number of lanes and bit-widths of matrix multiplication units, number of cache channels, and so on.

It is assumed for the purposes of the discussion of pseudocode 1500 and pseudocode 1600 (of FIG. 16) that there are two input matrices: a source A matrix and a source B matrix. It is also assumed that the size of the source A matrix is M×K, the size of the source B matrix is K×N, and the size of the result C matrix is M×N, where M, N, and K are positive integers. In one implementation, M, N, and K are equal to 1024. In other implementations, the values of M, N, and K can vary.

In one implementation, there are two sets of buffers in memory. A_outbuffer and B_outbuffer store the matrix elements of the source A matrix and the source B matrix, respectively, in memory in the linear format. A_package_outbuffer and B_package_outbuffer store the matrix elements of the source A matrix and the source B matrix, respectively, in memory in the tiling format. Based on the instructions in pseudocode 1500, elements of the source A matrix that are stored in consecutive memory locations in the linear format are stored in memory locations which are separated by a tile height in the tiling format. In other words, values are read from sequential locations of a first buffer (i.e., A_outbuffer) and written to locations in a second buffer (i.e., A_package outbuffer) while stepping through the second buffer with a stride equal to a tile height. After the source A matrix and the source B matrix are converted from the linear format to the tiling format, the kernel code executing on the compute units will load the data from memory into the cache (e.g., L2 cache).

Turning now to FIG. 16, one example of pseudocode 1600 for converting a source B matrix from a linear format to a tiling format is shown. The discussion of pseudocode 1600 is intended to be a continuation of the discussion of pseudocode 1500 (of FIG. 15). In one implementation, pseudocode 1600 is used to convert the source B matrix from a linear format to a tiling format. Once the source B matrix is converted from the linear format to the tiling format, the kernel code will load the data from memory into the cache.

Figure 17:
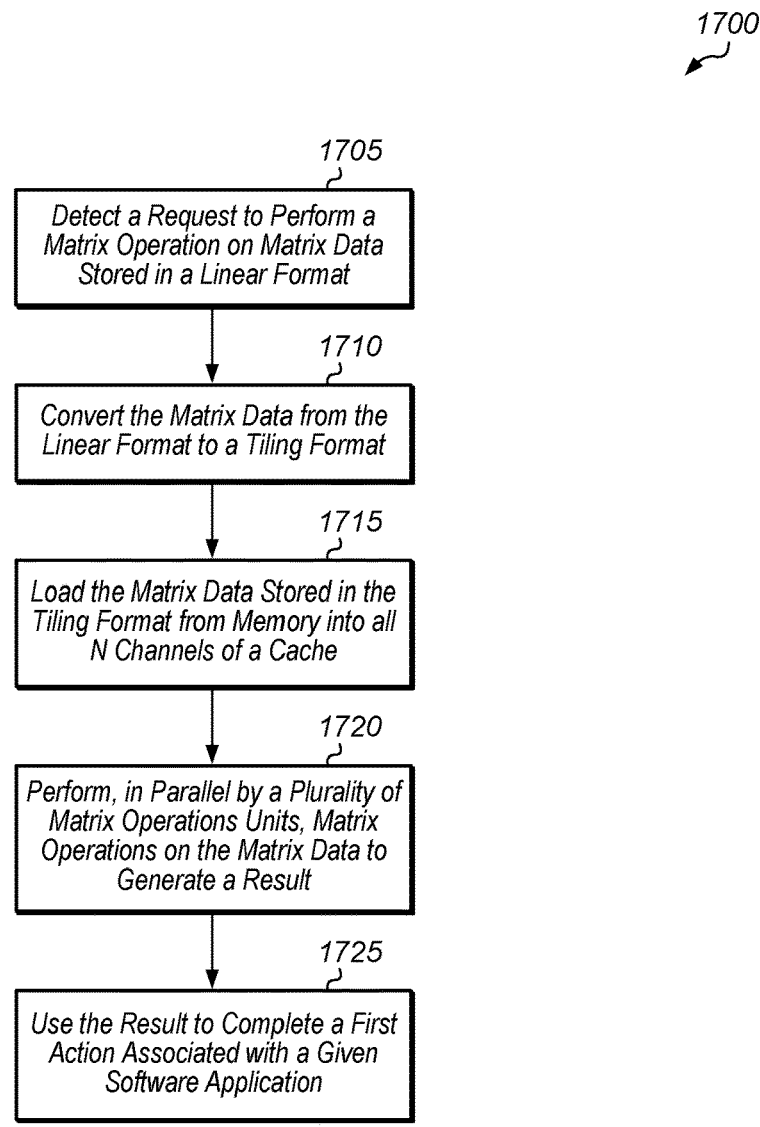
FIG. 17 is a generalized flow diagram illustrating one implementation of a method for converting matrix data from a linear format to a tiling format for performing a matrix operation.

Referring now to FIG. 17, one implementation of a method 1700 for converting matrix data from a linear format to a tiling format for performing a matrix operation is shown. For purposes of discussion, the steps in this implementation are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1700.

A host processor (e.g., CPU) detects a request to perform a matrix operation on matrix data stored in a linear format (block 1705). In one implementation, the matrix operation is a matrix multiplication operation. In other implementations, other types of matrix operations are requested. Next, in response to detecting the request, the host processor converts the matrix data from the linear format to a tiling format (block 1710). Examples of pseudocode 1500 and 1600 for converting a source A matrix and a source B matrix from a linear format to a tiling format are shown in FIG. 15 and FIG. 16, respectively. In other implementations, other techniques for converting a source A matrix and a source B matrix from a linear format to a tiling format can be utilized.

Next, a plurality of matrix operations units load the matrix data in the tiling format from memory into all N channels of a cache (block 1715). In one implementation, the cache is a L2 cache. In one implementation, the cache has N channels, where N is a positive integer greater than one. Then, the plurality of matrix operations units perform, in parallel, matrix operations on the matrix data to generate a result (block 1720). Next, the processor uses the result to complete a first action associated with a given software application (block 1725). In one implementation, the first action is the classification of a first dataset and the given software application is a machine learning application. In one implementation, the first dataset is an image, and the classification identifies a given category to which the image belongs. In another implementation, the first dataset is a video, and the classification assigns the video to a given category. In other implementations, the first dataset includes other types of data which are classified in other ways. In other implementations, other types of actions associated with other types of software applications are performed. After block 1725, method 1700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory storing a source matrix comprising a plurality of matrix elements in a linear format, wherein the source matrix has M columns and N rows, wherein M and N are positive integers;
a cache comprising a plurality of channels;
a processor configured to convert the source matrix from the linear format to a tiling format, wherein in the tiling format the matrix elements of the source matrix are stored as a plurality of tiles, each of the plurality of tiles having fewer elements than the source matrix; and
a plurality of compute units, wherein each compute unit of the plurality of compute units comprises one or more single instruction, multiple data (SIMD) units;
wherein while two or more compute units of the plurality of compute units are executing a same kernel in parallel, each of the two or more compute units is configured to:
load from the cache, via a different channel of the cache in parallel, a given plurality of the matrix elements of the plurality of tiles; and
perform a matrix operation on the given plurality of the matrix elements to generate a result in the tiling format.

2. The system as recited in claim 1, wherein the given plurality of the matrix elements are loaded by the two or more compute units in a single clock cycle.

3. The system as recited in claim 1, wherein each of the two or more compute units comprises a matrix operations unit, with at least one SIMD unit, with a number of lanes equal to M.

4. The system as recited in claim 1, wherein responsive to receiving a request to convert a plurality of matrix elements of a first source matrix from the linear format to a tiling format, the processor is configured to:
read values from sequential locations of a first buffer in the memory, wherein the first buffer stores matrix elements in the linear format; and
step through a second buffer with a stride equal to a tile height while writing the values to the second buffer, wherein the second buffer stores matrix elements in the tiling format.

5. The system as recited in claim 1, wherein the matrix operation is a matrix multiplication operation, and wherein the given plurality of the matrix elements are conveyed on a plurality of lanes of each matrix operations unit of the two or more compute units.

6. The system as recited in claim 1, wherein the source matrix corresponds to a first dataset and a classification of the first dataset is generated during execution of a machine learning engine application.

7. The system as recited in claim 1, wherein elements of a first source matrix that are stored in consecutive memory locations in the linear format are stored in memory locations which are separated by a tile height in the tiling format.

8. A method comprising:
converting, by a processor, a source matrix stored in a memory from a linear format to a tiling format, wherein in the linear format the source matrix has M columns and N rows, where M and N are positive integers, and wherein matrix elements of the tiling format of the source matrix are stored as a plurality of tiles, each of the plurality of tiles having fewer elements than the source matrix;
storing a plurality of matrix elements of the source matrix in the tiling format in a cache that comprises a plurality of channels;
executing, by two or more compute units, a same kernel in parallel;
loading, by each of the two or more compute units in parallel from the cache, a given plurality of matrix elements of one or more corresponding tiles from the cache via a different channel of the plurality of channels of the cache; and
performing, by each matrix operations unit, a matrix operation on the given plurality of matrix elements to generate a result in the tiling format.

9. The method as recited in claim 8, wherein the method further comprising loading the plurality of matrix elements by the two or more compute units in a single clock cycle.

10. The method as recited in claim 8, wherein responsive to receiving a request to convert a plurality of matrix elements of a first source matrix from the linear format to a tiling format, the method comprising:
reading values from sequential locations of a first buffer in the memory, wherein the first buffer stores matrix elements in the linear format; and stepping through a second buffer with a stride equal to a tile height while writing the values to the second buffer, wherein the second buffer stores matrix elements in the tiling format.

11. The method as recited in claim 8, further comprising conveying, for each matrix operations unit, the given plurality of matrix elements on a plurality of lanes of the matrix operations unit, and wherein the matrix operation is a matrix multiplication operation.

12. The method as recited in claim 8, wherein the source matrix corresponds to a first dataset and the method comprises generating a classification of the first dataset during execution of a machine learning engine application.

13. The method as recited in claim 8, wherein elements of a first source matrix that are stored in consecutive memory locations in the linear format are stored in memory locations which are separated by a tile height in the tiling format.

14. An apparatus comprising:
a memory storing a source matrix in a linear format, wherein the source matrix comprises a plurality of matrix elements, wherein the source matrix has M columns and N rows, and wherein M and N are positive integers; and
a plurality of compute units, each comprising one or more single instruction, multiple data (SIMD) units, configured to:
generate a request to convert the plurality of matrix elements from the linear format to a tiling format, wherein in the tiling format the matrix elements of the source matrix are stored as a plurality of tiles, wherein each of the plurality of tiles has fewer elements than the source matrix; and
while two or more compute units of the plurality of compute units are executing a same kernel in parallel, each of the two or more compute units is configured to:
load from a cache, via a different channel of the cache in parallel, a given plurality of the matrix elements of the plurality of tiles; and
perform a matrix operation on the plurality of matrix elements in the tiling format to generate a plurality of results in the tiling format.

15. The apparatus as recited in claim 14, wherein the given plurality of the matrix elements are loaded by the two or more compute units in a single clock cycle.

16. The apparatus as recited in claim 14, wherein each of the two or more compute units comprises a matrix operations unit, with at least one SIMD unit, with a number of lanes equal to M.

17. The apparatus as recited in claim 14, further comprising a command processor, wherein responsive to receiving a request to convert a plurality of matrix elements of a first source matrix from the linear format to a tiling format, the command processor is configured to:
read values from sequential locations of a first buffer in the memory, wherein the first buffer stores matrix elements in the linear format; and
step through a second buffer with a stride equal to a tile height while writing the values to the second buffer, wherein the second buffer stores matrix elements in the tiling format.

18. The apparatus as recited in claim 14, wherein matrix elements are conveyed on a plurality of lanes of each compute unit of the plurality of compute units, and wherein the matrix operation is a matrix multiplication operation.

19. The apparatus as recited in claim 14, wherein the source matrix corresponds to a first dataset and a classification of the first dataset is generated during execution of a machine learning engine application.

\* \* \* \* \*